(12) United States Patent
Lewis

(10) Patent No.: US 11,255,707 B2
(45) Date of Patent: Feb. 22, 2022

(54) HYBRID FLOW METER WITH VORTEX SENSOR AND DIFFERENTIAL PRESSURE SENSOR ARRANGEMENTS WITH FLUID FLOW METER DIAGNOSTICS

(71) Applicant: Kim Lewis, Windsor, CO (US)

(72) Inventor: Kim Lewis, Windsor, CO (US)

( * ) Notice: Subject to any disclaimer, the term of this patent is extended or adjusted under 35 U.S.C. 154(b) by 13 days.

(21) Appl. No.: 16/563,686

(22) Filed: Sep. 6, 2019

(65) Prior Publication Data

US 2019/0390987 A1   Dec. 26, 2019

Related U.S. Application Data

(63) Continuation of application No. 15/569,748, filed as application No. PCT/US2016/029399 on Apr. 26, 2016, now Pat. No. 10,451,460.

(60) Provisional application No. 62/153,490, filed on Apr. 27, 2015.

(51) Int. Cl.

| G01F 1/44 | (2006.01) |
| G01F 25/00 | (2022.01) |
| G01F 1/32 | (2022.01) |
| G08B 21/18 | (2006.01) |
| G01F 1/40 | (2006.01) |
| G01F 1/34 | (2006.01) |

(52) U.S. Cl.
CPC ............ *G01F 1/44* (2013.01); *G01F 1/3209* (2013.01); *G01F 1/34* (2013.01); *G01F 1/40* (2013.01); *G01F 25/0007* (2013.01); *G08B 21/182* (2013.01); *G01F 25/003* (2013.01)

(58) Field of Classification Search
None
See application file for complete search history.

(56) References Cited

U.S. PATENT DOCUMENTS

| 2,772,567 A | * | 12/1956 | Boden | G01F 1/90 73/861.02 |
| 3,785,204 A | * | 1/1974 | Lisi | G01F 1/86 73/861.03 |
| 5,152,181 A | * | 10/1992 | Lew | G01F 1/3218 73/861.02 |

(Continued)

OTHER PUBLICATIONS

Office Action for U.S. Appl. No. 15/569,748, dated Dec. 18, 2018, 10 pages.

(Continued)

*Primary Examiner* — Harshad R Patel
(74) *Attorney, Agent, or Firm* — Jordan IP Law, LLC; Todd A. Vaughn

(57) ABSTRACT

A hybrid flow meter includes a fluid obstruction element, two or more pressure ports, a support member, and a vortex shedding sensor system. The fluid obstruction element is placed in a fluid conduit, and includes a cone-shaped member having a pair of frusto-conical portions joined at their larger ends. The pressure ports provide measurement points for measuring a change in fluid pressure caused by the fluid obstruction element. The support member for the fluid obstruction element extends across the entire diameter of the fluid conduit, and is shaped to function as a vortex shedding bluff body, holds in place the fluid obstruction element. The vortex shedding sensor system provides a measurement point for measuring a vortex shedding frequency generated by the support member.

12 Claims, 11 Drawing Sheets

(56) References Cited

U.S. PATENT DOCUMENTS

| | | | | |
|---|---|---|---|---|
| 5,351,559 | A * | 10/1994 | Miau | G01F 1/3218 73/861.22 |
| 6,053,053 | A * | 4/2000 | Huotari | G01F 1/3209 73/861.22 |
| 7,308,832 | B1 | 12/2007 | Ifft | |
| 8,056,409 | B2 * | 11/2011 | Steven | G01F 1/3218 73/197 |
| 2002/0163427 | A1 | 11/2002 | Eryurek et al. | |
| 2005/0210998 | A1 * | 9/2005 | Dimarco | G01F 1/3245 73/861.22 |
| 2008/0072686 | A1 | 3/2008 | Hoecker | |
| 2010/0224009 | A1 | 9/2010 | Steven | |
| 2012/0297893 | A1 * | 11/2012 | Lawrence | G01F 1/40 73/861.52 |
| 2013/0213142 | A1 * | 8/2013 | Irani | G01F 1/44 73/861.52 |
| 2015/0219480 | A1 * | 8/2015 | Ayers | G01F 15/06 73/861.52 |
| 2017/0284841 | A1 | 10/2017 | Lais et al. | |
| 2018/0143048 | A1 * | 5/2018 | Lewis | G01F 1/3209 |

OTHER PUBLICATIONS

Notice of Allowance for U.S. Appl. No. 15/569,748, dated Jun. 7, 2019, 8 pages.

\* cited by examiner

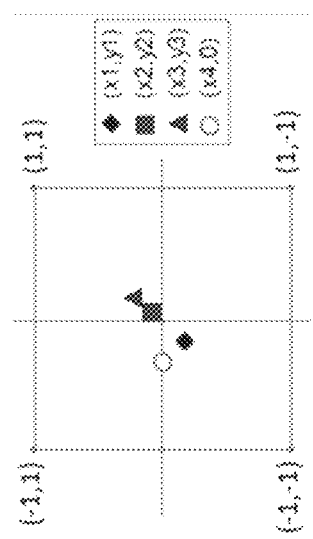
*Figure 2*
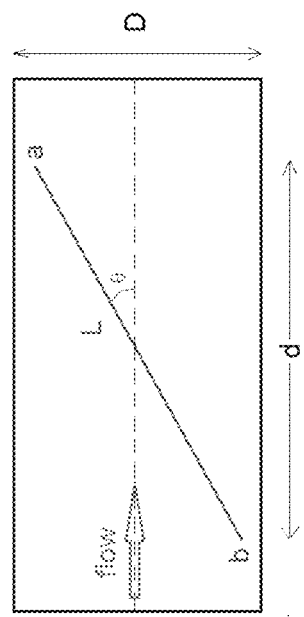
*Figure 3
(PRIOR ART)*
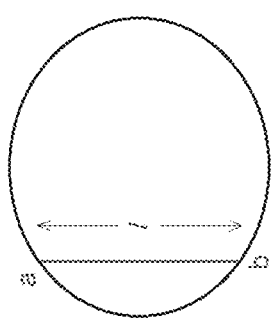

HYBRID FLOW METER WITH VORTEX SENSOR AND DIFFERENTIAL PRESSURE SENSOR ARRANGEMENTS WITH FLUID FLOW METER DIAGNOSTICS

RELATED APPLICATIONS

The present application is a continuation of U.S. patent application Ser. No. 15/569,748 (filed on Oct. 26, 2017), which itself is a National Stage Application of PCT International Application No. PCT/US2016/029399 (filed on Apr. 26, 2016), under 35 U.S.C. 371, which claims priority to U.S. Provisional Patent Application No. 62/153,490 (filed Apr. 27, 2015), which are each hereby incorporated by reference in their respective entireties.

INCORPORATION BY REFERENCE

Applicant(s) hereby incorporate herein by reference any and all patents and published patent applications cited or referred to in this application.

TECHNICAL FIELD

The present disclosure relates to fluid flow meter diagnostics, and in particular to methods of analysing fluid flow, fluid metering apparatus, and corresponding computer program products and methods.

BACKGROUND

Two significant advances in flow meter capabilities over the last two decades have been the reduction in flow measurement uncertainty and advances in flow meter diagnostics. These two issues are directly related. A meter's flow rate prediction uncertainty rating is only truly valid if there is a guarantee that the meter is fully serviceable. This guarantee can be supplied from the meter's diagnostic tools (or diagnostic 'suite').

It could be reasonably argued that over the last twenty years the advance in flow meter diagnostic suites has been more industrially significant than the reduction of flow rate prediction uncertainty. However, no flow meter has a diagnostic suite capable of identifying all (or even most) problems before those problems cause a flow rate prediction bias in excess of the stated uncertainty rating. Industry will therefore benefit from further advances in flow meter diagnostic capabilities.

The majority of single phase flow meter designs on the market today use some single specific fundamental flow metering technique. For example, Differential Pressure (DP) meters cross reference the physical laws of the conservation of mass and energy to derive the fluid flow rate. The vortex meter reads the frequency of shedding vortices off a bluff body. It relates this shedding frequency to the average fluid velocity and therefore flow rate. The ultrasonic meter takes discrete average velocity readings based on the difference in time of flight of ultrasonic waves upstream and downstream along paths in the meter body. With these readings it determines the overall average fluid velocity and hence the fluid flow rate. Much of the present marketing of each meter design consists of promoting the pros and downplaying the cons of that particular design while doing the opposite for the alternative technologies.

Each flow meter design persists on the market as it has benefits for particular applications. In many flow meter applications different technologies will each successfully and satisfactorily meter the fluid flow. Often there is little performance difference between competing flow meter technologies.

One flow meter design principle is to dispense with the limiting concept that one physical metering principle is better than another. It is known that there are merits in different physical principles. Therefore, instead of choosing one over the other, there is a principle of combining two or more physical principles. Such a hybrid meter should have the combined pros of both meters while potentially negating some of the cons of each meter.

Examples of this metering concept are the ideas of Boden (U.S. Pat. No. 2,772,567), Pfrehm (U.S. Pat. No. 3,430,489), Lisi (U.S. Pat. No. 3,785,204) and Mottram (GB 2,161,941). Boden combined a turbine meter with a Venturi DP meter. Pfrehm improved Boden's design. Lisi used Boden's principle to combine a vortex meter with different DP meters. Mottram improved on Lisi's design. These hybrid designs:
- produced metering systems with redundancy—i.e. two meters in one,
- produced 'over determination' of the flow rate—i.e. two flow rate predictions to check against each other when the two sub-systems operated independently,
- allowed the outputs of different flow meters, using different physical principles, to be cross referenced thereby producing extra flow information not attainable from either stand alone meter.

Therefore, it has been known for many years that combining different flow meter principles can produce distinct advantages for the metering of fluid flows.

However, even these hybrid meters still do not provide a diagnostic capability that can identifying all (or even most) problems before those problems cause a flow rate prediction bias in excess of the stated uncertainty rating. Industry will therefore benefit from further advances in flow meter diagnostic capabilities.

SUMMARY

According to a first aspect of the disclosure there is provided a method of analysing fluid flow comprising:
- performing a first set of diagnostic checks associated with a first type of flow meter;
- performing a second set of diagnostic checks associated with a second type of flow meter; and
- cross-referencing the first and second set of diagnostic checks.

The second type of flow meter is dissimilar from said first type of flow meter.

Optionally, cross-referencing the first and second set of diagnostic checks comprises identifying diagnostic alerts that are common between the first and second sets of diagnostic checks.

Optionally, performing a first set of diagnostic checks associated with a first type of flow meter comprises providing a first set of possible fault conditions; performing a second set of diagnostic checks associated with a second type of flow meter comprises providing a second set of possible fault conditions; and cross-referencing the first and second set of diagnostic checks comprises identifying possible fault conditions which are common to the first and second sets of possible fault conditions.

Optionally, the first type of flow meter is an ultrasonic flow meter and the second type of flow meter is a differential pressure flow meter.

Optionally, the ultrasonic flow meter and differential pressure flow meter are provided in series.

Optionally, a hybrid ultrasonic and differential pressure meter is provided.

Optionally, the first type of flow meter is a vortex flow meter and the second type of flow meter is a differential pressure flow meter.

Optionally, the vortex meter and the differential pressure meter are provided in series.

Optionally, a hybrid vortex differential pressure meter is provided.

Optionally, the set of diagnostic checks associated with a differential pressure meter comprises checking two or more differential pressure measurements taken by the meter, or measures derived therefrom.

Optionally, the differential pressure (DP) measurements may be selected from the traditional DP, recovered DP and permanent pressure loss DP, from one or more of the PLR, PRR or RPR ratios or normalised values thereof.

Optionally, the differential pressure measurements taken by the meter comprise:
- a total head loss differential pressure taken between a position upstream of a fluid obstruction and a position downstream of the fluid obstruction;
- a traditional differential pressure taken between the position upstream of the fluid obstruction and an intermediate position between the upstream and downstream positions; and
- a recovery differential pressure taken between the intermediate position and the downstream position.

Optionally, the set of diagnostic checks associated with an ultrasonic flow meter comprises checking one or more of: the path speed of sound, velocity ratios (inclusive of one or more of Profile Factor, Symmetry & Cross Flow factors), transducer gain, path performance, path turbulence, path signal to noise ratio.

Optionally, the set of diagnostic checks associated with a vortex flow meter comprises checking the vortex shedding signal to the background noise, checking the repeatability/stability of the vortex shedding, monitoring the amplitude and wave form of the shedding vortices.

According to a second aspect of the disclosure there is provided a flow metering apparatus comprising a first flow meter and a second flow meter; and a diagnostic system arranged to perform a first set of diagnostic checks associated with a first type of flow meter; perform a second set of diagnostic checks associated with a second type of flow meter; and to cross-reference the first and second set of diagnostic checks.

Optionally, the first flow meter is an ultrasonic flow meter and the second flow meter is a differential pressure flow meter.

Optionally, the ultrasonic pressure meter and differential pressure meter are provided in series.

Optionally, a hybrid ultrasonic and differential pressure meter is provided.

Optionally, the differential pressure meter comprises a Venturi constriction and the ultrasonic meter comprises at least one transducer pair provided at a throat portion of the Venturi constriction.

Optionally, the first flow meter is a vortex flow meter and the second flow meter is a differential pressure flow meter.

Optionally, the vortex meter and the differential pressure meter are provided in series.

Optionally, a hybrid vortex differential pressure meter is provided.

Optionally, the differential pressure meter comprises a Venturi constriction and the vortex flow meter comprises a vortex shedding bluff body at a throat portion of the Venturi constriction.

Optionally, the differential pressure meter comprises a fluid obstruction element placed in a fluid conduit; and a support member for the fluid obstruction element is also a vortex shedding bluff body.

Optionally, the fluid obstruction element comprises a cone-shaped element comprising a pair of frusto-conical portions joined at their larger ends.

Optionally, the support member extends across the entire diameter of a fluid conduit.

Optionally, a vortex shedding sensor system is positioned downstream of the support member but upstream of a nose portion of the fluid obstruction element.

Optionally, pressure ports for measuring pressures are angularly spaced from a vortex sensor port at the conduit.

Optionally, a fluid conduit is provided through the support member for a pressure port at one end and for a vortex sensor at its opposite end.

According to a third aspect of the present disclosure there is provided a computer program product including instructions that when executed on a computer device causes it to carry out calculations required for the method of the first aspect.

Optionally, the device comprises hardware or software included as part of a metering device, a flow computer, general purpose computer, or a combination of one or more thereof.

According to a fourth aspect of the present disclosure there is provided a hybrid flow meter comprising:
- a cone-shaped fluid obstruction element placed in a fluid conduit and comprising a pair of frusto-conical portions joined at their larger ends;
- two or more pressure ports providing measurement points for measuring a change in fluid pressure caused by the cone-shaped fluid obstruction element;
- a support member for the cone-shaped fluid obstruction element being shaped to function as a vortex shedding bluff body; and
- a vortex sensor system providing a measurement point for measuring a vortex shedding frequency generated by the support member; wherein
- the support member extends across the entire diameter of a fluid conduit.

Optionally, the vortex sensor system is positioned downstream of the support member but upstream of a nose portion of the cone-shaped fluid obstruction element.

Optionally, the pressure ports are angularly spaced from the vortex sensor port.

Optionally, a fluid conduit is provided through the support member for a pressure port at one end and for a vortex sensor port at its opposite end.

BRIEF DESCRIPTION OF THE DRAWINGS

The present disclosure will now be described, by way of example only, with reference to the accompanying drawings, in which:

FIG. 2 shows a Normalized Diagnostic Box (NDB) with diagnostic results;

FIG. 3 shows a Generic Ultrasonic Meter with a Single Path Shown;

DETAILED DESCRIPTION

Figure 1:
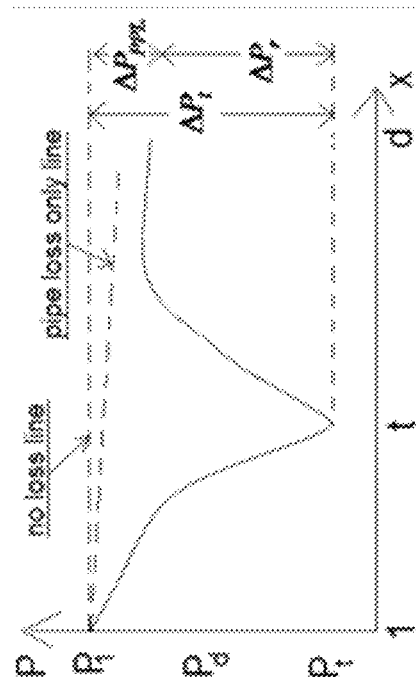
FIG. 1 shows a Venturi meter with instrumentation sketch and pressure fluctuation graph.
Figure 1:
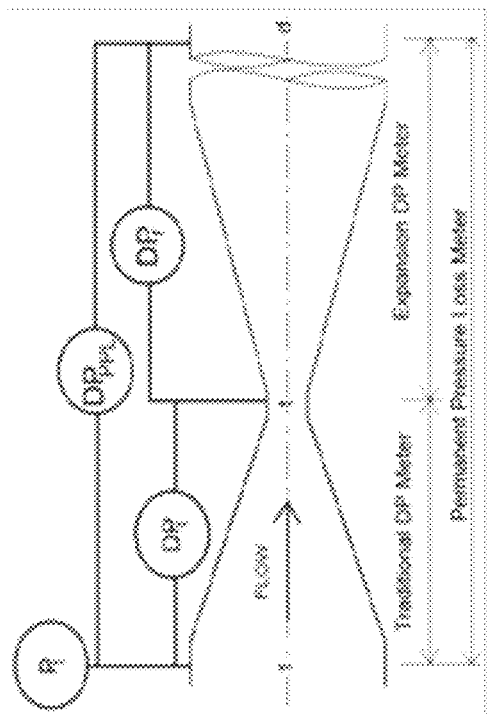

The present disclosure applies to flow of fluid through conduits or channels. A conduit generally encloses a fluid flowing through it while a channel will have one or more open sides for the passage of fluid flow. Conduits and channels may be natural or man-made. The term "fluid" as used herein refers to liquids, gases other media, or combinations thereof. The "other media" may include particulate or solid matter that is entrained with or dispersed in flowing fluid.

The metering of fluid flow involves measuring a given physical characteristic of fluid flow such as mass flow rate, volume flow rate, average flow velocity, fluid composition, density, temperature or generally any other physical parameter that it is desired to monitor.

Flow meters operate according to different physical principles but in all cases include some type of metering apparatus that interacts with the fluid flow in order to take a measurement. The measurement apparatus may include an element causing an obstruction to the fluid flow that causes a change in pressure and flow velocity together with instrumentation for measuring pressure at one or more points along a conduit. Examples of this type of apparatus include differential pressure meters (including Venturi, nozzle, orifice plate and cone type differential pressure meters). The measurement apparatus may include transmitter and/or receivers for sending a signal through the fluid. Examples of this type of apparatus include ultrasonic flow meters which measure the difference between an upstream and downstream time of flight of a sound wave traversing the conduit. Other types of metering apparatus are discussed elsewhere in this disclosure and known to those skilled in the art.

The metering apparatus measures one or more physical parameters (such as differential pressure, temperature, time of flight and so on). These physical parameters are used to derive the physical characteristics which are being measured, either by direct measurement, or by performing some further calculations, sometimes with reference to external data sources or other metering apparatus.

The basic concept of flow meter diagnostics is to provide some kind of check to test whether the measured or derived physical parameters are accurate. Advanced diagnostic systems can also suggest the possible causes of an erroneous reading, although this type of capability is generally not provided. Diagnostics may be provided by controlling the existing metering apparatus including external references where provided, and may also in some cases use additional diagnostic apparatus either alone or in combination with the existing metering apparatus and/or references.

In general, a flow meter diagnostic check will involve checking the measured or derived physical parameters by making redundant readings or by corroborating them with external references and/or expected results. Each different type of flow meter has an associated set of diagnostic checks that may be provided or carried out. This set of diagnostic checks is provided as a "diagnostics suite" that includes software that performs calculations on measured values and presents results via an associated display to a user. A diagnostic method therefore includes operating metering apparatus and any external references and specialised diagnostic apparatus according to a set routine to gather specific measurements, and then carry out calculations on the measured parameters in order to provide diagnostic information. A diagnostic system therefore includes a combination of hardware and software. The software controls the hardware to implement a metering and diagnostic method.

The diagnostic checks are specific for each type of flow meter and used exclusively in that context. Each meter design's diagnostic suite also has pros and cons. Each meter design's diagnostic suite can see some problems, and cannot see other problems, before a significant flow rate prediction bias is induced. Each meter design's respective diagnostic suites are inherently based on the physical principles that that meter utilises. Here, a flow meter "type" is defined by the physical mechanism used to meter the flow. Dissimilar meters use dissimilar physical mechanisms.

Specialised hardware and or software may be provided for carrying out the diagnostic checks. This can be provided arbitrary locations, including dedicated hardware or software provided within the body of a device forming part of the measurement apparatus (one example being the "head" of a DP transmitter used for calculating differential pressure measurements), as part of a dedicated flow computer (being a special ruggedized type of computing device for use in the field and specifically tailored for flow metering applications), as part of a general purpose computer, server or other computing device; or indeed any combination of these.

The disclosure in a general sense provides for the combination of a set of diagnostic checks associated with one type of flow meter together with a second set of diagnostic checks associated with a second dissimilar type of flow meter. These two sets of diagnostic checks are cross-referenced with each other to identify a metering malfunction and/or to provide significant additional information about the possible causes of a metering malfunction, as compared with the information that can be derived from a single set of diagnostic checks that is associated with a single type of flow meter. Combining dissimilar flow meters inclusive of their respective diagnostic suites produces a more powerful diagnostic capability. Some flow meter problems that say a first meter's diagnostic suite struggles to see could be much easier identified by a second meter's diagnostics suite, and vice versa.

Each set of diagnostic checks preferably also provides a set of possible fault conditions, and a selection of possible fault conditions can be identified based on the specific results of one or more diagnostic checks. In a preferred embodiment, a first set of possible fault conditions provided by a first set of diagnostic checks can be cross-referenced with a second set of possible fault conditions associated with a second set of diagnostic checks, with any possible fault conditions in common being identified as being good candidates for further investigation. This new capability provides maintenance crews or other parties additional intelligence to save time and resources investigating the causes of faulty metering.

Furthermore, any individual flow meter design's diagnostic suite presently produces a diagnostic output pattern that its manufacturers and operators attempt to understand. Much development has occurred in this field but the technology is still relatively immature. Several different problems can cause any given meter's diagnostic suite to produce a similar diagnostic output pattern. Therefore, whereas flow meter diagnostic suites are generally good at correctly telling its operator that something is wrong (i.e. giving a generic alarm), they are far less capable of suggesting just what the particular problem is. They can often discount some problems, as those problems are known to produce a different diagnostic response. However, they usually have a list of potential problems that could cause that particular diagnostic output pattern. This is rather unsatisfactory. More resolution on the meaning of the diagnostic output is desired.

Combining two different meter designs diagnostic systems can provide additional information about the meaning of these diagnostic outputs, helping narrow down the list of possible causes for an error or identify a specific cause, and can also provide the means to identify an error promptly. A communal metering problem will produce two distinct diagnostic outputs for the two meters, and different 'short lists' of what the problem may be. Only the problems that appear on both short lists are possible. In some cases the specific problem can be identified, in others the list of possible problems is significantly reduced, thereby aiding maintenance crews significantly.

There is potential benefit in combining any two dissimilar flow meters' diagnostic outputs. As way of examples in this text we will discuss below the particular combinations of ultrasonic meters and DP meter diagnostic technologies and vortex meter and DP meter diagnostic technologies.

The disclosure also provides a composite metering device comprising two or more flow meters of dissimilar type being provided together with cross-referenced diagnostics. The flowmeters of dissimilar type may be connected in series or parallel, or combined in a hybrid design in which metering apparatus associated with a first type of meter and metering apparatus associated with a second type of meter are either physically combined or provided at the same conduit position.

1. DP Meters and DP Meter Diagnostics

Most generic Differential Pressure (DP) meters operate according to the same principles. FIG. 1 shows a generic sketch of a Venturi DP meter. The inlet pressure ($P_1$) is measured (shown) along with the fluid temperature (not shown). From known fluid properties the fluid density ($\rho$) can be predicted and is then available for use in the flow rate calculation. This fluid density prediction is therefore external to the metering system.

The generic DP meter utilises the conservation of mass. For an incompressible flow this is expressed as equation 1, where 'm' is the mass flow rate, 'Q' is the volume flow rate, $A_1$ & $A_t$ are the inlet and minimum (or 'throat') cross sectional areas respectively, and $U_1$ & $U_t$ denote the average fluid velocity at the inlet and throat sections respectively. Rearranging (for an incompressible fluid) gives the inlet velocity expression shown as equation 2.

Conservation of mass expression:
$$m = \rho Q = \rho A_1 U_1 = \rho A_t U_t \quad (1)$$

Re-arranging the conservation of mass expression:

$$U_1 = \frac{A_t}{A_1} U_t \quad (2)$$

The conservation of energy of a horizontal incompressible flow (with no energy losses) through a Venturi meter is expressed by equation 3. Rearranging (for an incompressible fluid) gives the inlet velocity expression shown as equation 4.

Conservation of energy expression:

$$\frac{P_1}{\rho} + \frac{U_1^2}{2} = \frac{P_t}{\rho} + \frac{U_t^2}{2} \quad (3)$$

Re-arranging the conservation of energy expression:

$$U_1 = \sqrt{U_t^2 - \frac{2\Delta P_t}{\rho}} \quad (4)$$

Note that the differential pressure between the inlet and the throat is the 'traditional' DP and is denoted by $\Delta P_t$.

$$U_1 = \frac{A_t}{A_1} U_t = \sqrt{U_t^2 - \frac{2\Delta P_t}{\rho}} \quad (5)$$

$$U_t = \sqrt{\frac{2\Delta P_t}{\left\{\rho\left(1 - \left(\frac{A_t}{A_1}\right)^2\right)\right\}}} \quad (6)$$

Equating the throat velocity expression from the conservation of mass & energy expressions gives Equation 5. Re-arranging gives Equation 6. Substituting equation 6 into equation 1 produces the mass flow expression equation 7.

$$m = \rho Q = \rho A_t U_t = \rho A_t \sqrt{\frac{2\Delta P_t}{\rho\left\{1 - \left(\frac{A_t}{A_1}\right)^2\right\}}} = E A_t \sqrt{2\rho \Delta P_t} \quad (7)$$

Note that beta ($\beta$), a geometry value for a given DP meter, is defined by equation 8. The "Velocity of Approach" (denoted as 'E'), a geometry value, is defined as equation 9. In reality the discharge coefficient ($C_d$) is added to account for real world effects, while an expansion factor ($\varepsilon$) is used in gas flow meter applications to account for the gas density fluctuation through the DP meter body. The actual mass flow rate prediction equation for a generic DP meter is therefore equation 10. The actual volume flow rate prediction is equation 11

$$\beta = \sqrt{\frac{A_t}{A_1}} \tag{8}$$

$$E = \frac{1}{\sqrt{1-\beta^4}} \tag{9}$$

$$\boxed{m = \rho Q = EA_t \varepsilon C_d \sqrt{2\rho \Delta P_t}} \tag{10}$$

$$\boxed{Q = EA_t \varepsilon C_d \sqrt{\frac{2\Delta P_t}{\rho}}} \tag{11}$$

Steven (U.S. Pat. No. 8,136,414) developed a generic DP meter diagnostic suite. FIG. 1 shows a sketch of a Venturi DP meter and its pressure field. The DP meter has a third pressure tap downstream of the two traditional pressure ports. This allows three DPs to be read, i.e. the traditional ($\Delta P_t$), recovered ($\Delta P_r$) and permanent pressure loss ($\Delta P_{PPL}$) DPs. These DPs are related by equation 12. The percentage difference between the inferred traditional DP (i.e. the sum of the recovered & PPL DPs) and the read DP is $\delta$ %, while the maximum allowed difference is $\theta$ %.

DP Summation: $\Delta P_t = \Delta P_r + \Delta P_{PPT}$, uncertainty $\pm \theta$ % (12)

Traditional flow calculation: $m_{trad} = f_t(\Delta P_t)$, uncertainty $\pm x$ % (13)

Expansion flow calculation: $m_{exp} = f_r(\Delta P_r)$, uncertainty $\pm y$ % (14)

PPL flow calculation: $m_{PPL} = f_{PPL}(\Delta P_{PPL})$, uncertainty $\pm z$ % (15)

Each DP can be used to meter the flow rate, as shown in equations 13, 14 & 15. Here $m_{trad}$, $m_{exp}$ & $m_{PPL}$ are the mass flow rate predictions of the traditional, expansion & PPL flow rate calculations. Symbols $f_t$, $f_r$ & $f_{PPL}$ represent the traditional, expansion & PPL flow rate calculations respectively, and, x %, y % & z % represent the uncertainties of each of these flow rate predictions respectively. Inter-comparison of these flow rate predictions produces three diagnostic checks. The percentage difference of the PPL to traditional flow rate calculations is denoted as $\psi$ %. The allowable difference is the root mean square of the PPL & traditional meter uncertainties, $\phi$ %. The percentage difference of the expansion to traditional flow rate calculations is denoted as $\lambda$ %. The allowable difference is the root mean square of the expansion & traditional meter uncertainties, $\xi$ %. The percentage difference of the expansion to PPL flow rate calculations is denoted as $\chi$ %. The allowable difference is the root mean square of the expansion & PPL meter uncertainties, $\nu$ %.

Reading these three DPs produces three DP ratios, the 'PLR' (i.e. the PPL to traditional DP ratio), the PRR (i.e. the recovered to traditional DP ratio), the RPR (i.e. the recovered to PPL DP ratio). DP meters have predictable DP ratios. Therefore, comparison of each read to expected DP ratio produces three diagnostic checks. The percentage difference of the read to expected PLR is denoted as $\alpha$ %. The allowable difference is the expected PLR uncertainty, a %. The percentage difference of the read to expected PRR is denoted as $\gamma$ %. The allowable difference is the expected RPR uncertainty, b %. The percentage difference of the read to expected RPR is denoted as $\eta$ %. The allowable difference is the expected RPR uncertainty, c %.

These seven diagnostic results can be shown on the operator interface as plots on a graph. That is, we can plot (FIG. 2) the following four co-ordinates to represent the seven diagnostic checks:

($\psi$ %/$\phi$ %, $\alpha$ %/a %), ($\lambda$ %/$\xi$ %, $\gamma$ %/b %), ($\chi$ %/$\nu$ %, $\eta$ %/c %) & ($\delta$ %/$\theta$ %, 0).

For simplicity we can refer to these points as ($x_1, y_1$), ($x_2, y_2$), ($x_3, y_3$) & ($x_4, 0$).

The act of dividing the seven raw diagnostic outputs by their respective allowed variances is called 'normalisation'. A Normalised Diagnostics Box (or 'NDB') of corner coordinates (1,1), (1,−1), (−1,−1) & (−1,1) can be plotted on the same graph (see FIG. 2). This is the standard user interface with the DP meter diagnostic system. All four diagnostic points inside the NDB indicate a serviceable DP meter. One or more points outside the NDB indicates a meter malfunction.

2. Transit Time Ultrasonic Meters and Ultrasonic Meter Diagnostics

An ultrasonic wave moving downstream or upstream in a homogenous fluid flow moves at the speed of sound plus or minus the fluid velocity respectively. Hence, if the difference between the upstream and downstream time of flight ($\Delta t$) between two points (of known distance apart) is measured, this will give the average fluid velocity along that path (u).

Consider the meter geometry shown in FIG. 3. The left side shows a cross-sectional view of a fluid conduit looking down the longitudinal axis of the conduit. Ultrasound transceivers are placed at positions a and b. These positions are in a plane parallel to the sagittal plane of the fluid conduit (left hand side figure), but are at different longitudinal positions, as seen in the right hand side of the figure.

Across the path shown the upstream ($t_{ab}$) and downstream ($t_{ba}$) transit times are calculated by equations 16 & 17 respectively. Note that 'c' and 'u' are the speed of sound and the average velocity across that path.

$$t_{ab} = \frac{L}{c - u \cos \theta} \tag{16}$$

$$t_{ba} = \frac{L}{c + u \cos \theta} \tag{17}$$

Equations 16 & 17 are solved for the average velocity, i.e. see equation 18.

$$u = \frac{L}{2 \cos \theta} \frac{\Delta t}{t_{ab} t_{ba}} = \frac{L^2}{2d} \frac{\Delta t}{t_{ab} t_{ba}} \tag{18}$$

It can also be shown that the speed of sound is found by equation 19.

$$c = \frac{L \Delta t}{2 t_{ab} t_{ba}} \tag{19}$$

If we were to consider the average velocity (u) measured across the single path representative of the average velocity in the pipe ($u_{av}$), then from equation 1, the volume flow is given by equation 20 and the mass flow is given by equation 21.

$$Q = A_1 u_{av} = A_1 \frac{L^2}{2d} \frac{\Delta t}{t_{ab} t_{ba}} \quad (20)$$

$$m = \rho Q = \rho A_1 \frac{L^2}{2d} \frac{\Delta t}{t_{ab} t_{ba}} \quad (21)$$

Figure 5:
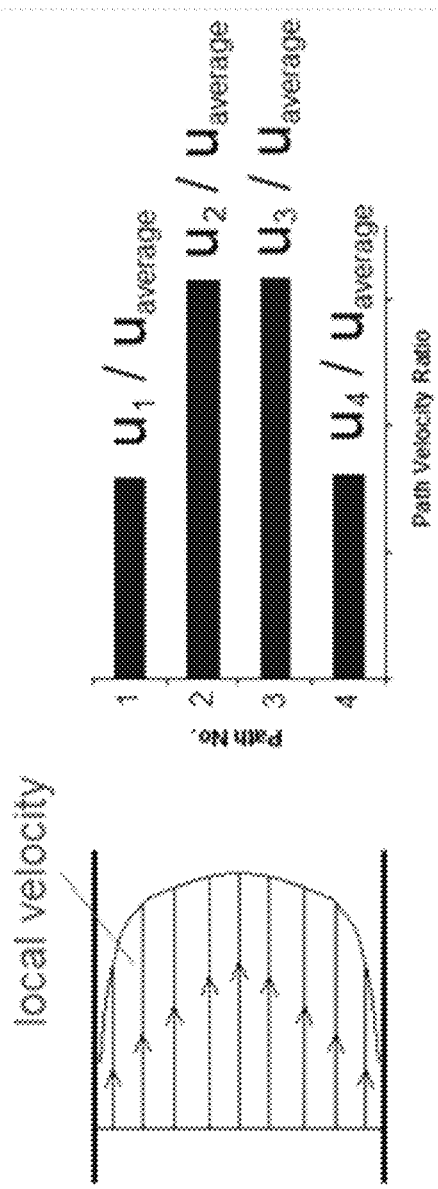
FIG. 5 shows a Sketch of Fully Developed Velocity Profile & Correct Path Velocity Ratios for a chordal four path ultrasonic meter.

In reality, all fluid flows in pipes have a velocity profile, where due to wall friction the local velocity varies across the cross sectional area, from lowest velocity near the wall to highest at the centreline (see FIG. 5). Hence, the calculation of the true average velocity of the flow ($u_{av}$) is dependent on the number of paths and where these paths are located.

Figure 4:
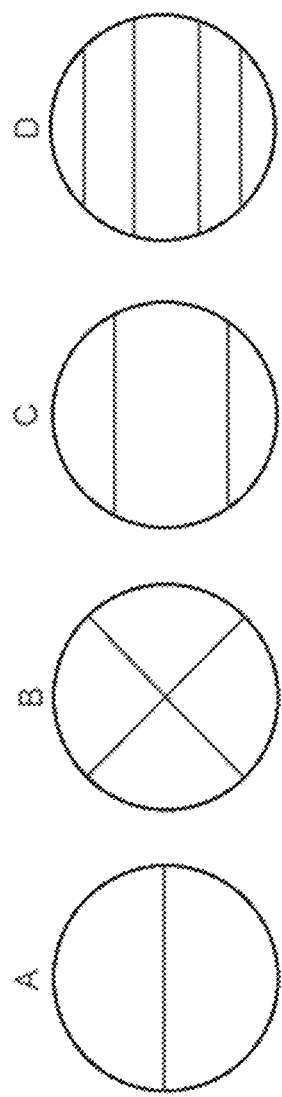
FIG. 4 shows some Typical Path Arrangements for Ultrasonic Meters.

FIG. 4 shows typical path arrangements for ultrasonic meters. The method of averaging the individual path velocity measurements to obtain the overall the average flow velocity ($u_{av}$) is given by the following expressions, for cases A, B, C and D respectively:

$$u_{av} = u$$

$$u_{av} = \frac{u_1 + u_2}{2}$$

$$u_{av} = \frac{u_1 + u_2}{2}$$

$$u_{av} = \frac{\sum w_i V_i}{A_1}$$

One commercially common path configuration is the four path design (FIG. 4D). The calculation relating the four individual discrete path velocities to the average flow velocity and volume flow rate is more complicated in this configuration. These chordal (i.e. path) locations are set by techniques for numerical integration. ($V_i$ represents volume flow and $w_i$ represents a weighting fraction derived for a particular geometry, i.e. chordal positions).

Regardless of the number of paths used, and whatever the chordal positions of those paths are, an ultrasonic meter will predict the average fluid velocity through the meter. Hence, all ultrasonic meters predict the fluid volume flow by finding the average velocity ($u_{av}$) and then applying equation 22. Unlike the DP meter the ultrasonic meter can predict the fluids volume flow rate without knowledge of the fluid density.

However, as with the DP meter, the ultrasonic meter cannot tell the mass flow rate without an external input of the fluid density. Equation 23 is the ultrasonic meter mass flow rate equation.

$$\dot{Q} = A_1 \bar{u} \quad (22)$$

$$\dot{m} = \rho A_1 \bar{u} \quad (23)$$

Unlike DP meters all commercial ultrasonic meters have had a generic diagnostic system available since the early development phase of the metering concept. There tends to be several diagnostic checks that most ultrasonic meter manufacturers utilise, including:

Path Speed of Sound
Velocity Ratios (including checks on various derived parameters)
Transducer Gain
Path Performance (i.e. signal quality)
Path Turbulence (i.e. standard deviation of signals)
Path Signal to Noise Ratio
Speed of Sound Each ultrasonic path measures the average velocity across that path and the speed of sound (see equation 19). The speed of sound measurement is independent of the fluid velocity. Hence, for a homogenous fluid flow, each path should measure the same speed of sound. A diagnostic check is to compare the speed of sound readings of each path. They have to agree within an allowable uncertainty. For multipath ultrasonic meters, if the speed of sound measurements do not agree a diagnostic alarm is set. If one path's speed of sound is significantly different to several others this suggests that that path has a problem.

Furthermore, if the individual path speed of sound measurements do agree, then their average speed of sound can be compared to a speed of sound check independent of the meter. This independent check is usually calculated from fluid samples, pressure & temperature readings and a reputable Equation of State calculation. If the meter and external supplied speed of sound readings do not match this is a diagnostic result suggesting that the external speed of sound prediction is incorrect. The practical implication of that is the fluid properties being used are likely to be incorrect, and hence the fluid density and therefore the mass flow rate predictions may be wrong.

Velocity Ratios

The velocity ratio is defined as the ratio of an individual path's average velocity to the average measured flow velocity. For a 'fully developed flow', i.e. flow with no upstream disturbances, velocity distribution across a pipe/meter body is symmetrical (see FIG. 5) and has no swirl component. A given ultrasonic meter geometry, with set paths, should therefore have set predictable velocity ratios. The average flow velocity can increase or decrease, but the velocity ratios remain relatively constant over a very large flow range. Velocity ratios are therefore a useful ultrasonic meter diagnostic tool.

Industry usually looks at a plot similar to the right hand side of FIG. 5, but also uses basic mathematical relationships to create parameters that more clearly show any velocity ratio diagnostic patterns. Three common parameters based on velocity ratios are the Profile Factor ('PF'), symmetry ('S') and cross flow ('CF'). Profile Factor, symmetry and cross flow are defined by equations 24, 25 & 26 respectively. Symmetry and Cross Flow should theoretically be unity (and are set at some value close to unity by calibration). The Profile Factor is set by the path geometry and calibration.

$$PF = \frac{\left(\frac{u_2}{u_{av}}\right) + \left(\frac{u_3}{u_{av}}\right)}{\left(\frac{u_1}{u_{av}}\right) + \left(\frac{u_4}{u_{av}}\right)} \quad (24)$$

$$S = \frac{\left(\frac{u_1}{u_{av}}\right) + \left(\frac{u_2}{u_{av}}\right)}{\left(\frac{u_3}{u_{av}}\right) + \left(\frac{u_4}{u_{av}}\right)}, \quad (25)$$

$$CF = \frac{\left(\frac{u_1}{u_{av}}\right) + \left(\frac{u_3}{u_{av}}\right)}{\left(\frac{u_2}{u_{av}}\right) + \left(\frac{u_4}{u_{av}}\right)} \quad (26)$$

Velocity ratios, and these associated parameters, can indicate if the flow is asymmetrical and/or swirling (which causes flow rate prediction biases) or if one (or more) path/s have a problem (which leads to incorrect path velocity measurement and hence flow rate prediction errors). An allowable variation/uncertainty is set by the operator for each parameter, and an alarm is set if this is exceeded. Other path configurations can have similar analysis with the precise parameters being chosen for those configurations.

Transducer Gain

Each chord has two ultrasonic transducers, transducers A & B. These transducers send ultrasonic wave signals through the flowing medium to each other. In normal operation the strengths of the signals sent upstream & downstream remain relatively constant. Modern ultrasonic meters have an automatic 'gain control', i.e. an automatic control on signal strength required in order that that signal can be identified by its paired transducer. As there are two transducers per chord there are two gain (dB) values associated with each chord. An increase in transducer gain (i.e. required signal strength) is the meter reacting to a weaker signal at the receiving transducer. This can be caused by various issues, e.g. transducer malfunction, contamination on the transducer face, liquids in a gas flow etc. An allowable variation/uncertainty is set by the operator for each transducers gain value (noting there are two per chord—A to B & B to A), and an alarm is set if this is exceeded.

Path Performance

This ultrasonic meter diagnostic checks the performance of an individual path. Each path attempts to measure a set number of delta time readings per unit time. If one of those attempted measurements was unsuccessful (for whatever reason, e.g. the ultrasonic wave signal was too weak, distorted etc.) then that difference in time measurement is lost. The ratio of the successfully read to attempted delta time measurements is that paths 'performance'. Monitoring this 'performance' is another ultrasonic meter diagnostic check. Correct operation of a path should produce a high performance. However, the path performance can be affected by a malfunctioning transducer, by flow disturbance or other problems. An allowable variation/uncertainty is set by the operator for each path performance, and an alarm is set if this is exceeded.

Path "Turbulence"

The term 'turbulence' in ultrasonic meter diagnostics should not be confused with the meaning of 'turbulence' in fluid mechanics. The 'turbulence' value of an ultrasonic meter's path is the standard deviation of that path's delta time readings, i.e. the stability of the result over time. Correct operation of a transducer pair with a reasonably stable flow should produce a relatively low repeatable standard deviation. The outside paths, i.e. the paths closer to the meter wall, tend to see more turbulence than the inside paths due to wall friction effects. However, any given individual path will have some reasonably constant signal standard deviation. If any path starts showing a change in this standard deviation this could be an indication of a metering problem, e.g. a problem with a transducer, or a change in the stability of the flow. For example, a partial blocked flow conditioner upstream of the ultrasonic meter causes significant flow disturbance which will manifest itself in a flow rate prediction bias and a significant increase in path standard deviation. An allowable variation/uncertainty is set by the operator for each paths 'turbulence'/'standard deviation', and an alarm is set if this is exceeded.

Path Signal to Noise Ratio (SNR)

Each transducer can read the background acoustic noise between sending and receiving signals from its paired transducer. This allows it to distinguish between the background noise and the signal. A correctly operating transducer in a normal flow metering application should see a very significant difference between the strength of the signal and the background noise. The measure of signal strength to background noise is called the "Signal to Noise Ratio", or "SNR".

There can be quite a range of SNR's between meter applications. As long as the signal can be distinguished from the background noise, a low SNR is not in itself a problem. However, monitoring the SNR can be a useful diagnostic. An unusually low SNR (i.e. excessive noise) can indicate the presence of a noise generating pipe component close to the meter. If that noise generation is not controlled it could increase to cause the meter to fail. An allowable minimum SNR value is set by the operator for each path, and an alarm is set if this is exceeded.

Wave Form

A newer ultrasonic meter diagnostic is the monitoring of wave form. Each transducer sends a signal by vibrating in the flowing medium to create ultrasonic waves. The vibration ramps up and ramps down causing the amplitude of the waves of each signal to increase to a maximum and decrease away from that maximum. The form of the signals resulting wave form should be clearly decipherable at the receiving transducer. The level of deformation of the received wave form holds information to the condition of the flowing medium in which it passed.

Ultrasonic Meter Diagnostic Displays

Figure 6:
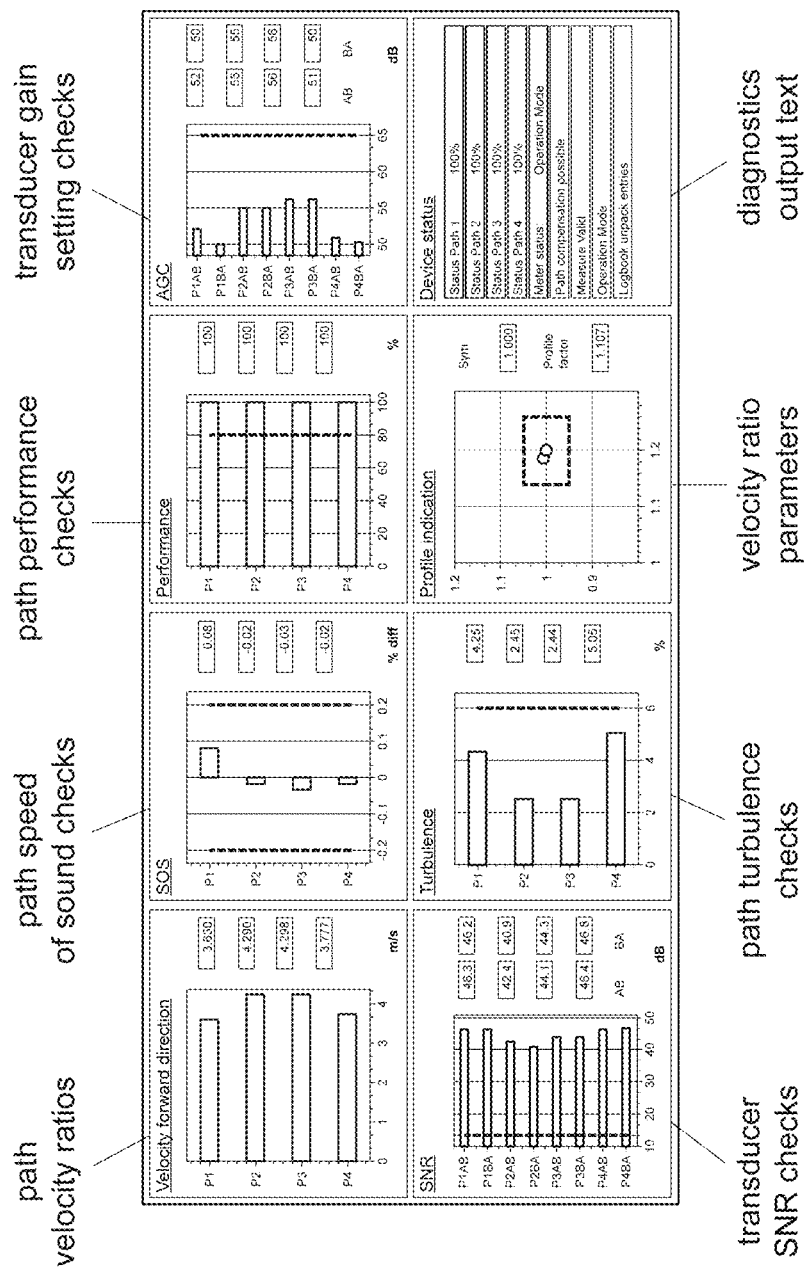
FIG. 6 shows an arbitrarily chosen Sample Ultrasonic Meter Diagnostic Suit System/Operator Interface Display.

Most ultrasonic meter manufacturers have chosen their own ways of displaying these diagnostics checks on their meter/operator interface. There is no agreed standard for display. FIG. 6 shows an example of one manufacturer's chosen ultrasonic meter diagnostic display. As shown, the display has separate portions which show the path velocity ratios, path speed of sound checks, path performance checks, transducer gain setting checks, transducer SNR checks, path turbulence checks, velocity ratio parameters, and diagnostic output text. This is shown as an example only and the invention disclosed here is not ultrasonic meter or display type specific.

Regardless of the display lay out, these ultrasonic meter diagnostic checks are valuable for telling the operator information about both the state of the meter and the flow through the meter.

3. Vortex Meters and Vortex Meter Diagnostics

Figure 7:
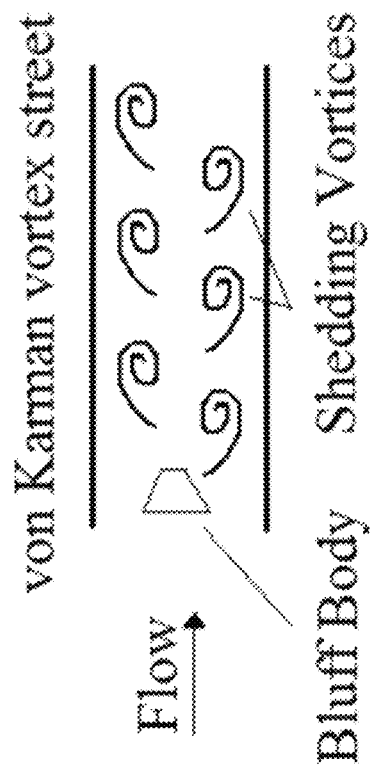
FIG. 7 shows the Principle of cyclic vortex shedding from a bluff body.

A vortex meter operates by exposing a bluff body to the fluid stream. Vortices are shed from the bluff body in a cyclic fashion (see FIG. 7). This series of downstream vortices is called a "von Karman vortex street". The vortex shedding frequency, as shown as "signal" in FIG. 8, has a nominally linear relationship with the average fluid velocity. Hence, reading the vortex shedding frequency allows the average flow velocity and therefore the volume flow rate to be found.

The shape of the bluff body is manufacturer dependent. The vortex shedding frequency is read by different manufacturers in different ways, e.g. DP fluctuations between either side of the bar, strain gauges on a tab put under cyclic stress by the vortices, fluctuations in ultrasound waves downstream of the bluff body etc. The shape of the bluff body and the choice of vortex shedding frequency is not significant to the general metering principle or the generic diagnostic system being discussed here.

The generic vortex meter volume flow rate and mass flow rate equations are shown as equation 27 & 28, where 'f' is the read vortex shedding frequency and "$K_v$" is the vortex meter "K-factor" which is usually found by calibration.

$$Q = A_1 U_1 = \frac{f}{K_v} \tag{27}$$

$$m = \rho Q = \rho A_1 U_1 = \rho \frac{f}{K_v} \qquad (28)$$

Figure 8:
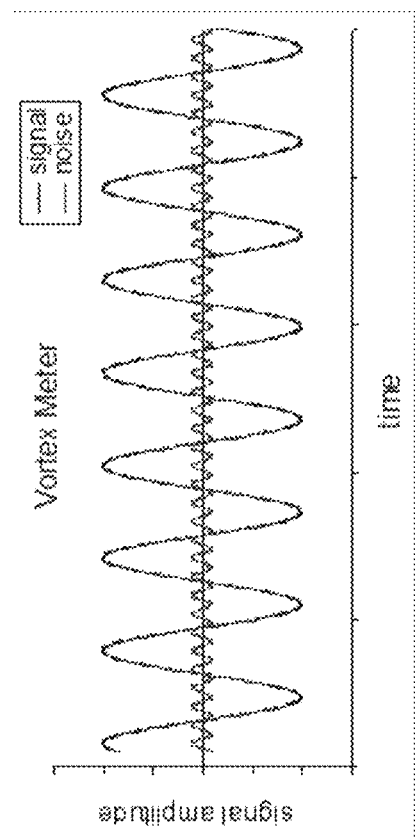
FIG. 8 shows an idealised Vortex Meter Primary Shedding Frequency & the Background Noise.

In practice the vortex meter sensor will pick up the primary vortex shedding frequency and background noise. FIG. 8 shows the two separate signals. In reality the two signals are not received separately (as shown in FIG. 8) but combined, i.e. superimposed on top of each other making a more complicated signal reading. In most applications the primary vortex shedding frequency will be strong, and for a relatively steady flow, of relatively constant amplitude and wavelength. Background noise usually consists of a weaker signal of different wavelength, which may or may not be steady depending on the source.

Vortex meter manufacturers tend to install a capability to send a test signal from the sensor to the electronics to confirm that the electronics are serviceable. If the vortex meter passes this internal check then there is a guarantee the problem is not in the sensor system/electronics. Any unusual vortex shedding sensor results are therefore seen to be due to either a meter issue (i.e. corrosion, contamination, erosion/impact damage etc.) or flow condition issues (e.g. bubbly liquid, wet gas, asymmetric flow, pulsation etc.). In this case generic vortex meter diagnostics use various forms of sophisticated signal analysis to distinguish background noise from the primary signal, and to analyse the primary signal (and the background noise) to decipher what information is in the signal. This is a vortex meter type of wave form analysis. From this analysis vortex meter diagnostics can distinguish between a sensor malfunction and real physical issues. This analysis can then discount some physical problems and short list others that could cause such a signal abnormality. Vortex meter diagnostic output displays are manufacturer dependent, i.e. there is no set display used throughout industry.

4. A Mass Flow Meter Concept

As mentioned above, Boden and Pfrehm combined a turbine meter with a DP meter. Lisi and Mottram combined a vortex meter with a DP meter. Turbine and vortex meters both predict the average velocity and hence the volume flow rate without requiring the fluid density as an input. They are therefore called 'velocity meters', and their volume flow rate prediction is density insensitive. DP meters require the fluid density be supplied from an external source in order to meter the volume or mass flow rate. That is, their volume flow rate prediction is density sensitive. Boden et al stated that density insensitive and density sensitive meters in series would produce a volume flow rate prediction, a density prediction and therefore a mass flow rate prediction. This meter combination does not require density information from an external source in order to predict the mass flow rate. Such a metering system which predicts mass flow rate without any density information being supplied can be called a "mass meter". Furthermore, the two dissimilar meters in series offer flow metering redundancy, along with flow rate over determination (if the density value is available from an external/independent source) and rudimentary inter-comparison diagnostics of flow rate and density predictions.

Figure 9:
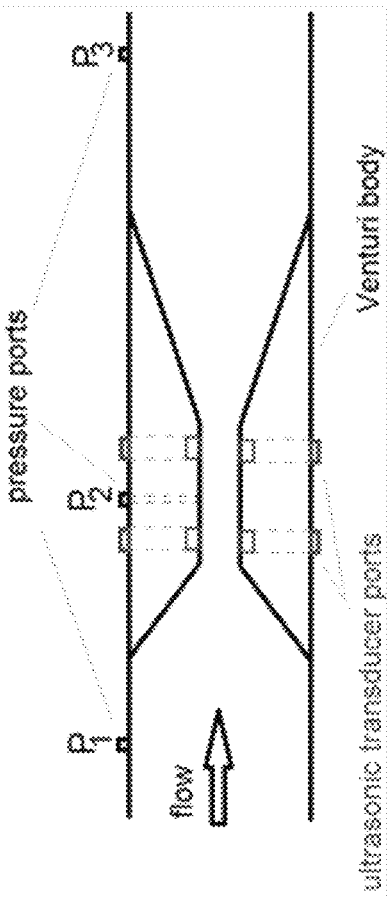
FIG. 9 shows an Ultrasonic Meter Embedded in a Venturi Meter Throat.
Figure 10:
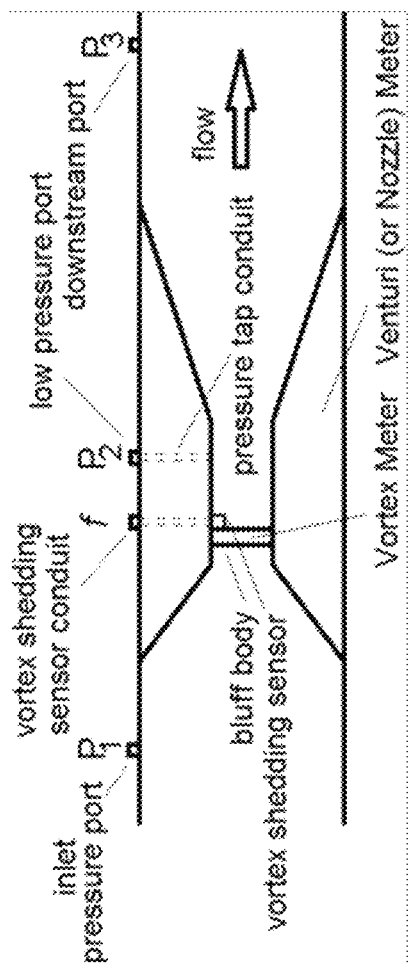
FIG. 10 shows a Vortex Meter Imbedded in Venturi Meter Throat.

An ultrasonic meter is, like the vortex and turbine meters, a 'velocity meter'. It meters the volume flow rate with no density input required. Both ultrasonic and vortex meter's volume flow rate predictions are density insensitive. Hence, an ultrasonic meter, vortex meter or any velocity meter can be used with a DP to form a mass meter. An ultrasonic meter, vortex meter or any velocity meter can be installed with a DP meter independently in series, or a hybrid design can be used. One such hybrid design is the ultrasonic meter in the throat of the Venturi (or nozzle) meter, as sketched in FIG. 9. Another hybrid design is a vortex meter in the throat of the Venturi (or nozzle) meter, as sketched in FIG. 10. It is possible to modify the design of the meter of FIG. 10 by angularly spacing the low pressure tap and the vortex sensor port, for example by 180 degrees, so that they do not interfere with each other.

The type of vortex meter (e.g. bluff body design & shedding sensor design) or the type of ultrasonic meter (e.g. transducer design, number and position of paths) is arbitrary. Any pair of stand-alone velocity meter and DP meter designs could be put in series. Any calibrated Venturi & ultrasonic meter hybrid design, or any calibrated Venturi and vortex meter design, where the two meters operate successfully as independent meters will operate as a volume meter, densitometer and mass flow meter.

The velocity meter, regardless of whether it is a stand-alone meter in series with a DP meter, or provided as part of a hybrid design such as in the throat of a Venturi or nozzle meter, will produce an independent volume flow rate prediction (i.e. see equation 22). The DP meter volume flow rate prediction is shown as equation 11. If we denote the velocity meter's volume flow rate prediction as $Q_{vm}$, then substituting that value into the DP meter equation gives equation 29.

$$Q_{vm} = EA_t \varepsilon C_d \sqrt{\frac{2\Delta P_t}{\rho}} \qquad (29)$$

$$\rho = (2\Delta P_t)\left\{\frac{EA_t \varepsilon C_d}{Q_{vm}}\right\}^2 \qquad (29a)$$

The only unknown parameter in equation 29 is the fluid density. Equation 29a shows the calculation re-arranged to find the density. Once the density and volume flow rate are known the mass flow is derived from equation 1.

Such density sensitive and density insensitive flow meter combinations have been considered periodically for many years. However, the addition of also combining their respective diagnostic suites has not until now been considered.

Presently no meter manufacturer promotes a velocity meter and a DP meter in series, or a hybrid velocity and DP meter, as a mass flow meter. Some ultrasonic and vortex meter manufacturers do restrict (i.e. reduce) the inlet area of their meters and then expand the area back to the pipe area behind the meter. Whereas this may look like a Venturi meter with an ultrasonic or vortex meter in the throat it is not. No DPs are read for flow measurement. The purpose of the reduction of inlet area is to accelerate the flow and thereby help flow condition the velocity profile to the 'fully developed' flow profile required for good metering. Hence, this design is not a Venturi meter with a velocity meter located at the throat. No DPs are read, no Venturi meter flow rate predictions are made, and no DP meter diagnostics are considered.

5. A Hybrid Vortex and Cone Differential Pressure Meter

Figure 11:
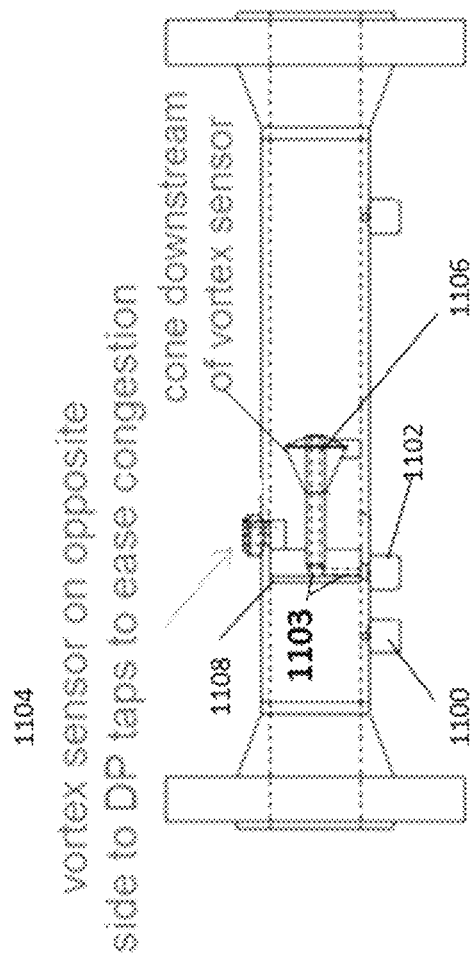
FIG. 11 shows a hybrid vortex and cone meter design.

One type of differential pressure meter comprises a fluid obstruction element placed in a fluid conduit to cause a pressure drop. The fluid obstruction element is held in place by a support member. The fluid obstruction element may be of many different shapes but one example is the so-called cone DP meter, in which the fluid obstruction element comprises a pair of frusto-conical portions joined at their larger ends. An example hybrid design is shown in FIG. 11, which shows the combination of a vortex meter and a differential pressure meter.

The standard cone DP meter has a circular cone support bar that extends vertically down from the wall of a conduit to its centre line, where it is attached to the apex of the cone. The basic concept of a hybrid vortex and DP meter is to use the support member of the fluid obstruction member as a vortex shedding bluff body. The normal circular profile of the support bar may be modified in order to provide effective vortex shedding.

However, the inventor has found that a bluff body/cone support bar that only extends down to the centre line of the fluid conduit is not effective and does not guarantee vortex shedding.

Standard vortex meters have bluff bodies that extend the full length/diameter of the pipe. It was realized that in a hybrid design, a vortex meter bluff body that only extending half way across a pipe was creating a flow disturbance due to bluff body tip effects, and that disturbance was interfering with the vortex shedding. It was discovered that it is not possible to simply replace the cone meter standard support with a bluff body support. A hybrid design must have a full length vortex meter bluff body for the vortex meter to be guaranteed to operate successfully.

A hybrid design therefore extends the bluff body/cone support to the full meter body diameter. The bluff body spans the length of the meter body diameter and can be attached at both ends to the pipe wall. This design gave the bluff body more chance of producing the required vortex shedding while it had the additional structural benefit of significantly increased the stiffness of the bluff body/cone assembly. This increases the structure's resonance frequency thereby reducing the likelihood of any long term fatigue failure, while also increasing the overall strength of the assembly.

The inventors have also realised that the position of the vortex shedding sensor is important for vortex shedding to be reliably detected. Testing has shown that vortex shedding is intermittent, not steady, and not reliable if the vortex shedding sensor is too close to the downstream cone element. If the vortex shedding sensor is positioned at the standard downstream location as found with standard standalone vortex meters, and the cone element is positioned at the standard cone meter position downstream of the cone support, then it has been found that the vortices being produced by the vortex shedding bluff body are destroyed or dissipated by the cone. At the location of the vortex sensor the vortices varied between weak and non-existent.

Therefore, the inventor has realised that the vortex sensor should be downstream of the bluff body support bar and yet upstream (and clear of) the nose of the downstream cone. Note that here, the 'nose' of the cone is defined as the start of the reduction of flow area (as shown in FIG. 11). FIG. 11 shows the hybrid meter prototype design.

A final design consideration born of the practical experience of manufacturing these prototypes is that the coupling for the pressure port through the vortex shedding bluff body support bar is in very close longitudinal proximity to the coupling for the vortex sensor. Combining the couplings beside each other means that the welds for the couplings can overlap. This can cause welding/manufacturing difficulties, and could, if the welding was compromised, cause structural weakness. It was therefore realized that the coupling for the vortex sensor could be angularly offset from the coupling for the pressure port; and with the extension of the bluff body support bar across the length of the pipe diameter the vortex sensor and pressure port could be a positioned directly opposite, at 180 degrees, thereby avoiding sensor mounting congestion. This is shown in FIG. 11, showing a hybrid design with pressure taps 1100, 1102, pressure transmitting fluid conduit 1103, vortex sensor 1104, cone 1106, and combined support member and bluff body 1108.

6. Advantages of Combining Flow Meters and Their Respective Diagnostic Outputs

Combining (i.e. cross referencing) the diagnostic systems of different flow meters in series, or combined in a hybrid metering system, is advantageous as it supplies the system operator significantly enhanced diagnostic information.

Some examples of this technique will now be explained. These examples do not limit the scope of the disclosure and do not represent an exhaustive list of the possibilities. However they do clearly disclose to individuals skilled in the art of flow metering the wide ranging advantages such a combination of technologies offers.

Example 1

DP meters and ultrasonic meters (like most flow meters) require that the inlet flow is 'fully developed', i.e. has no flow disturbances. If the flow is disturbed it affects the relevant sensor readings on both meters, and hence causes a flow rate prediction bias. This bias will traditionally go unnoticed unless meter diagnostics can identify a problem exists. Both the DP meter and ultrasonic meter diagnostic suites can identify a problem when there is some disturbance upstream of the meter, say a partially blocked flow conditioner making the problem of disturbed flow worse instead of better. However, note that the respective diagnostic suites show 'a' problem exists, not 'that particular problem'. If the problem is extreme enough then perhaps the individual diagnostic suites will independently identify asymmetrical (i.e. disturbed) flow exists. However, if the issue is severe enough, then the issue will become evident by external mass balance checks. It is important to identify a problem, and ideally what the problem is before the issue (and mismeasurement) becomes extreme.

Figure 12:
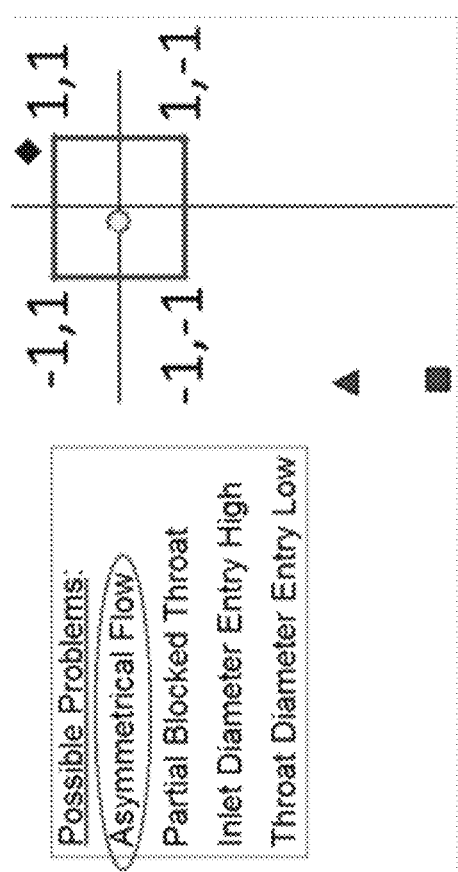
FIG. 12 shows a Differential Pressure Meter Diagnostic Suite Response to Asymmetrical Flow.

FIG. 12 shows a reproduction of an orifice DP meter diagnostic suite response to disturbed (asymmetrical) flow. The diagnostic result is of the form shown in FIG. 2, that is, symbols which out outside the normalised diagnostics box indicate that there is a problem. The response presents to the operator a list of possible problems which in this case include asymmetrical flow, partial blocked throat, inlet diameter entry high, and throat diameter entry low. The response of generic DP meters are all similar. Modern DP meter diagnostic suite also supplies a 'short list' of problems that can cause that diagnostic pattern. This short list shows the known problems that will induce a DP meter's diagnostic system to show that diagnostic warning pattern. (For DP meters this averaged pattern is also caused by wet gas flow, but wet gas flow also causes a tell-tale instability in the DP readings, i.e. a high standard deviation in the DPs read, and hence wet gas would be discounted as a possibility by the diagnostic system in this case.)

Figure 13:
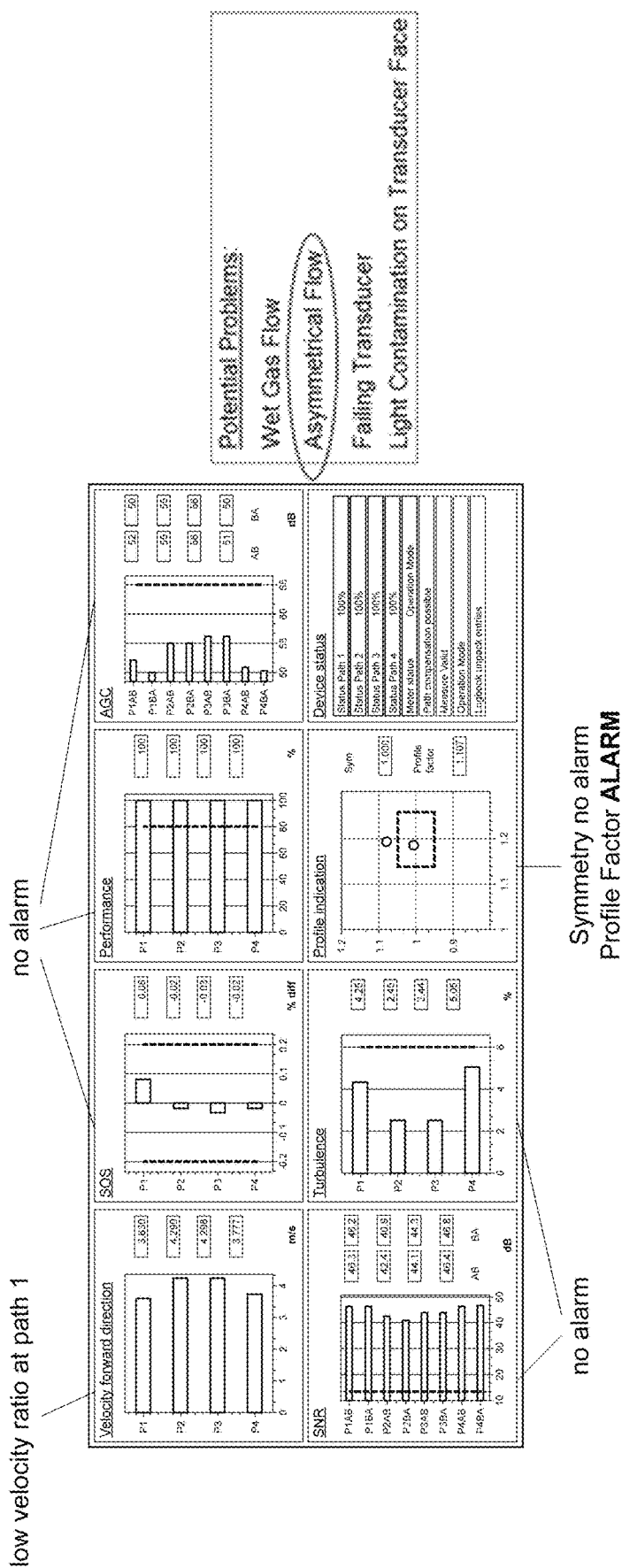
FIG. 13 shows an Ultrasonic Meter Diagnostic Suite Response to Asymmetrical Flow.

FIG. 13 shows a hypothetical response of a generic ultrasonic meter diagnostic suite to asymmetrical flow. The modern ultrasonic meter diagnostic suites do not yet tend to present the operator with a 'short list' of potential problems that could cause that diagnostic pattern. Nevertheless, a trained operator could deduce such a list from examining the diagnostic pattern.

FIG. 13 shows for a low to moderate asymmetrical flow (where the induced flow rate error is still enough to be very significant), much of the ultrasonic meter diagnostic suite does not pick up the problem. The speed of sound check is immune to the problem. The path performance, gain, SNR and turbulence diagnostics are not sensitive enough to see low to moderate asymmetrical flow. It is the path velocity ratio checks, and specifically the profile factor, that is sensitive to this problem. An experienced engineer could see such a diagnostic response shown in FIG. 13 and note that there is a list of ultrasonic meter problems that could cause such a warning pattern. That list is shown in FIG. 13 and comprises wet gas flow, asymmetrical flow, failing transducer, and light contamination on a transducer face.

Both the ultrasonic meter and DP meter see a problem but they cannot individually identify what specific problem exists. However, if the two meters are used together, cross referencing the two meters diagnostic suites cuts the potential problems down very significantly. In this case the combined system would show the problem is specifically asymmetric/disturbed inlet flow.

Example 2

Figure 14:
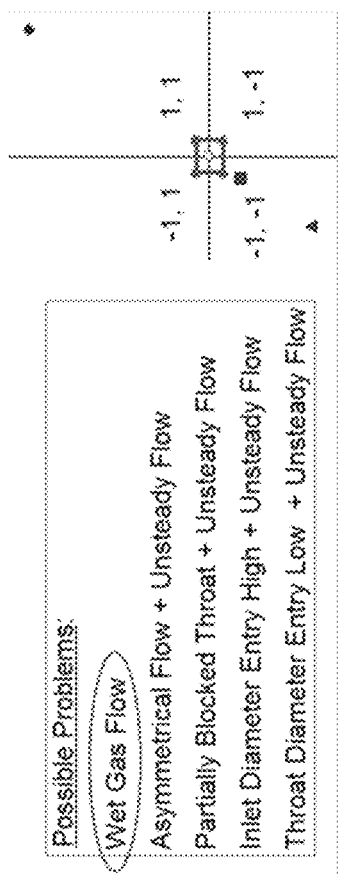
FIG. 14 shows a Differential Pressure Diagnostic Suite Response to Wet Gas Flow.

Wet gas flow is an extremely adverse flow condition for both DP and ultrasonic meters. FIG. 14 shows sample DP meter diagnostic data taken from a 6" Venturi meter under wet gas flow tests. The Venturi meter's diagnostic suite is known to be very sensitive to wet gas flow. The result shown is for liquid flow of <0.5% by total volume. The average pattern is similar to the DP meter disturbed flow pattern. However, an accompanying significant increase in DP instability informs the DP meter diagnostic system that the flow is either wet gas flow or a combination of another problem coupled with the flow being unsteady, as illustrated by the box on the left hand side of FIG. 14.

As with asymmetrical flow if the problem is severe enough the issue may be seen by external checks for an ultrasonic meter. However, we are interested in low to moderate problems, where the diagnostics are needed to identify a problem, and ideally what the problem is, before the issue (and mis-measurement) becomes extreme. The ultrasonic meter diagnostic suite has a number of checks that can identify wet gas flow, but unfortunately most only see wet gas once the liquid loading is moderate to substantial and the metering error is very significant. The primary (most sensitive) ultrasonic meter diagnostic checks for wet gas flow are again the path velocity ratios, and in particular the symmetry and profile factor. For low to moderate liquid loading wet gas flows it is these diagnostics that will set an alarm, i.e. see FIG. 15.

Figure 15:
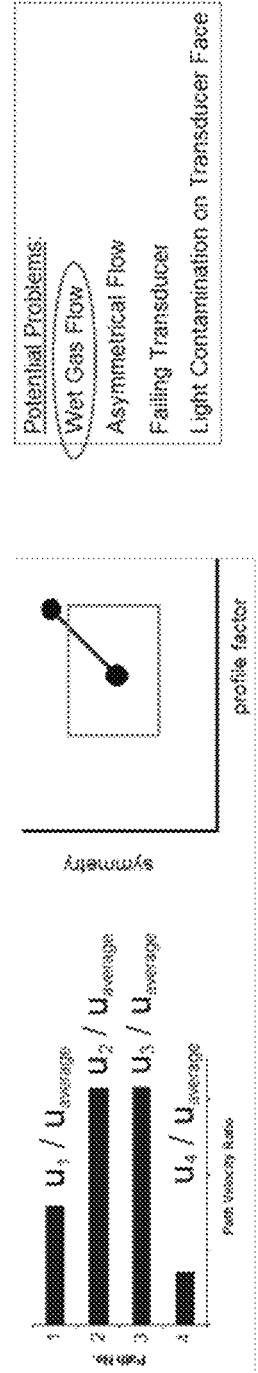
FIG. 15 shows an Ultrasonic Meter Diagnostic Result Caused by Wet Gas Flow.

FIG. 15 shows a list of potential issue that could cause such an ultrasonic meter diagnostics suite response. Not surprisingly in this example they are the same as in the first example. However, note when cross-referenced with the DP meter diagnostic response it can be inferred that wet gas flow is the communal problem. (Note that the ultrasonic meter discrete velocity measurements do not tend to have the same level of instability with wet gas flow as a DP meter's DP signal. This allows for a distinction.)

Example 3

The diagnostic suites of the ultrasonic meter and DP meter together mutually support each other.

If an ultrasonic meter speed of sound check does not agree with the external independent speed of sound prediction then this is an indication that the gas chromatograph/Equation of State fluid property predictions are erroneous. A stand-alone DP meter's diagnostic system is blind to erroneous density inputs. In this example, the combination of the ultrasonic meter and DP meter diagnostics results in the ultrasonic meter showing that both meters' density input (from the communal external density prediction source) is untrustworthy. In this case the operator can then utilise the combined ultrasonic meter & DP meter density prediction (i.e. see Section 4).

Alternatively, if one or more of the ultrasonic meter transducers begins to fail in service, the ultrasonic meter diagnostics will indicate this issue. The DP meter diagnostic suite will be unaffected, and the warning alarm will be from the ultrasonic meter diagnostic suite alone. This is an indicator that the problem cannot be flow conditions (e.g. wet gas flow or asymmetrical flow) as this would affect both meters in their own ways. The problem is therefore known to be with the ultrasonic meter mechanics only. Hence, in this case the ultrasonic meter defaults to assuming the velocity across that lost path/s by assuming the velocity profile was fully developed. That is, the ultrasonic meter has to assume that there are no flow condition problems that its diagnostic system is blind to while one or more of its transducers are off line. However, the DP meter and its diagnostic system in series with the ultrasonic meter will show the operator there are no flow condition problems thereby alleviating the need for this risky unfounded assumption. Furthermore, the DP meter with no diagnostic alarm is shown to be fully serviceable and can therefore take over as the primary meter until the ultrasonic meter receives maintenance.

Example 4

Say a liquid flow is being metered with a vortex meter and a DP meter. In this example the liquid has entrained gas. Entrained gas in liquid flows (i.e. 'bubbly flow') causes flow meters to mis-measure the liquid flow rate.

Figure 16:
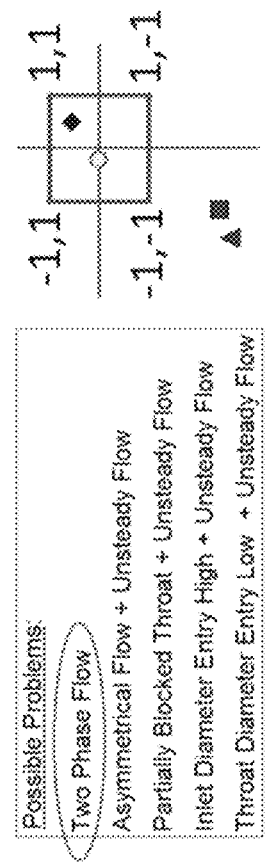
FIG. 16 shows a DP Meter Gas Entrainment in Liquid Flow Diagnostic Result.
Figure 17:
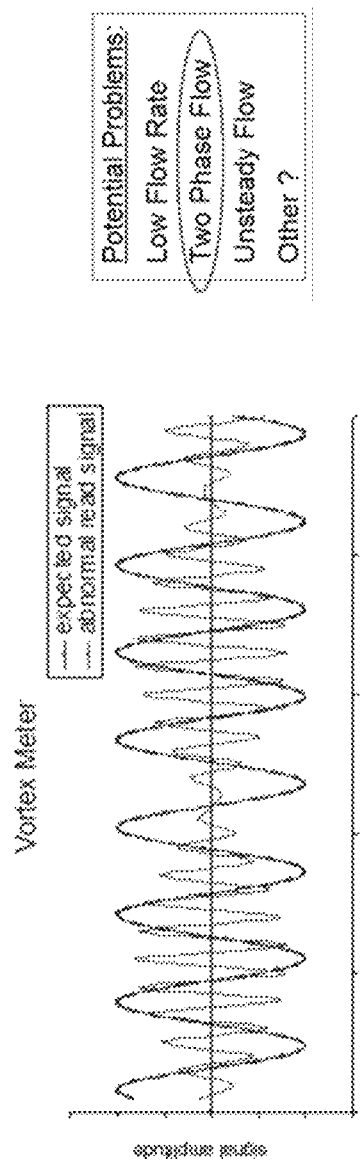
FIG. 17 shows a Vortex Meter Abnormal Signal Reading for Diagnostic Analysis.

FIG. 16 shows the diagnostic result of an orifice meter with gas entrained in the liquid. Gas entrained in liquid flows causes the DP meter read DPs to be relatively unsteady. This is a direct analogy with wet gas flow in gas flow applications. This DP stability issue helps the DP meter diagnostic system.

FIG. 16 shows an example of an abnormal vortex shedding frequency which would be analysed by a vortex meter diagnostic suite. In this case the vortex meter diagnostic suite would first check the integrity of the transmitter by sending a signal to it. Once the signal was confirmed as real, signal analysis would short list potential issues that could cause such a signal. In this example two-phase flow (i.e. gas entrained in the liquid flow meter application) is one communal result between the DP & vortex meter diagnostic systems. The presence of both meters and their diagnostic suite therefore significantly reduces the list of possible problems the meter may be encountering.

These examples show that instead of being competing independent technologies, as industry presently views DP & various velocity meter designs and their respective diagnostic suites, this disclosure of combining the two technologies inclusive of their respective diagnostic suites offers significant advantages to industry.

Naturally, those skilled in the art of flow metering will realise that similar benefits are clearly available by combining different embodiments of this generic concept. Any dissimilar flow meters (i.e. two or more meters that operate by utilising different principles, i.e. different laws of physics) with respective diagnostic suites can be similarly combined to significantly enhance the diagnostic resolution.

The future of flow metering design is not solely in improving single meter technology concepts to get an operational advantage over competing different technologies. The future of flow metering also lies with embracing the advantages of different metering technologies and using them together to support each other.

Various improvements and modifications can be made to the above without departing from the scope of the disclosure.

What is claimed is:

1. A hybrid flow meter, comprising:
a fluid obstruction element placed in a fluid conduit, the fluid obstruction element including a cone-shaped member having a pair of frusto-conical portions joined at their larger ends;
two or more pressure ports providing measurement points for measuring a change in fluid pressure caused by the fluid obstruction element;
a support member to hold in place the fluid obstruction element in the fluid conduit and also generate vortex shedding, the support member extending across the entire diameter of the fluid conduit; and
a vortex shedding sensor system providing a measurement point for measuring a vortex shedding frequency of the vortex shedding generated by the support member.

2. The hybrid flow meter of claim 1, wherein the vortex shedding sensor system is positioned downstream of the support member but upstream of a nose portion of the fluid obstruction element.

3. The hybrid flow meter of claim 1, wherein pressure ports for measuring pressures are angularly spaced from a vortex sensor port at the conduit.

4. The hybrid flow meter of claim 3, wherein a second fluid conduit is provided through the support member for fluidic communication to a pressure port at one end of the support member and for fluidic communication to the cone-shaped member.

5. The hybrid flow meter of claim 1, providing in a hybrid arrangement a differential pressure flow meter arranged to measure a fluid flow rate derived from the measured change in fluid pressure caused by the fluid obstruction element, and a vortex flow meter arranged to measure a fluid flow rate derived from the measured vortex shedding frequency generated by the support member.

6. The hybrid flow meter of claim 5, further comprising a diagnostic system arranged to:
perform a first set of diagnostic checks associated with the differential pressure flow meter;
perform a second set of diagnostic checks associated with the vortex flow meter; and
cross-reference the first and second set of diagnostic checks.

7. The hybrid flow meter of claim 6, wherein the set of diagnostic checks associated with the differential pressure meter comprises checking two or more differential pressure measurements taken by the differential pressure flow meter, or measures derived therefrom.

8. The hybrid flow meter of claim 7, wherein the differential pressure (DP) measurements are selected from the traditional DP, recovered DP and permanent pressure loss DP, from one or more of the PLR, PRR or RPR ratios or normalised values thereof.

9. The hybrid flow meter of claim 7, wherein the differential pressure measurements taken by the meter comprise:
a total head loss differential pressure taken between a position upstream of a fluid obstruction and a position downstream of the fluid obstruction;
a traditional differential pressure taken between the position upstream of the fluid obstruction and an intermediate position between the upstream and downstream positions; and
a recovery differential pressure taken between the intermediate position and the downstream position.

10. The hybrid flow meter of claim 6, wherein the set of diagnostic checks associated with a vortex flow meter comprises checking the vortex shedding signal to background noise, checking the repeatability/stability of the vortex shedding, monitoring the amplitude and wave form of the shedding vortices.

11. The hybrid flow meter of claim 6, wherein the cross-reference of the first and second set of diagnostic checks comprises identifying diagnostic alerts that are common between the first and second sets of diagnostic checks.

12. The hybrid flow meter of claim 11, wherein:
performing a first set of diagnostic checks associated with a first type of flow meter comprises providing a first set of possible fault conditions;
performing a second set of diagnostic checks associated with a second type of flow meter comprises providing a second set of possible fault conditions; and
the cross-reference of the first and second set of diagnostic checks comprises identifying possible fault conditions which are common to the first and second sets of possible fault conditions.

* * * * *